United States Patent
Park et al.

(10) Patent No.: US 7,004,028 B2
(45) Date of Patent: Feb. 28, 2006

(54) CAPACITANCE Z-AXIS ACCELEROMETER

(75) Inventors: Ho Joon Park, Seoul (KR); Kyoung Soo Chae, Seoul (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 101 days.

(21) Appl. No.: 10/822,692

(22) Filed: Apr. 13, 2004

(65) Prior Publication Data

US 2005/0132804 A1     Jun. 23, 2005

(30) Foreign Application Priority Data

Dec. 20, 2003   (KR)   .................. 10-2003-0094318

(51) Int. Cl.
   *G01P 15/125*   (2006.01)

(52) U.S. Cl. .................................. 73/514.32

(58) Field of Classification Search ............. 73/514.32, 73/514.38, 514.24
   See application file for complete search history.

(56) References Cited

U.S. PATENT DOCUMENTS 5,814,727 A * 9/1998 Matsuda .................. 73/514.32
6,122,963 A * 9/2000 Hammond et al. ...... 73/514.32

* cited by examiner

Primary Examiner—John E. Chapman
(74) Attorney, Agent, or Firm—Lowe Hauptman & Berner, LLP

(57) ABSTRACT

Disclosed is a capacitance accelerometer comprising a fixed electrode, a movable electrode and support beams. The fixed electrode has rectangular fixed electrode plates arranged parallel with a top surface of an insulation board. The fixed electrode plates are placed one above another via posts, and arranged on an electrode-fixing section of the insulation board. The movable electrode has rectangular movable electrode plates alternating with the fixed electrode plates. The movable electrode plates are placed one above another via connector posts placed within guide holes perforated through the fixed electrode plates. The support beams connect the movable electrode with beam-fixing sections to elastically support the movable electrode. The capacitance z-axis accelerometer can be integrated together with x- and y-axis accelerometers into a single chip, maximize the change of capacitance to achieve excellent acceleration sensitivity, and utilize an amplifier and a filter of low cost.

17 Claims, 7 Drawing Sheets

A – A'

CAPACITANCE Z-AXIS ACCELEROMETER

BACKGROUND OF THE INVENTION

1. Field of the Invention

The present invention relates to a capacitance accelerometer, and more particularly, a capacitance z-axis accelerometer which can be integrated together with x- and y-axis accelerometers into a single chip and maximize the change of capacitance to achieve excellent acceleration sensitivity in the z-axial direction as well as utilize an amplifier and a filter of low cost.

2. Description of the Related Art

An accelerometer is known as a Micro Electro Mechanical System (MEMS) device. MEMS devices indicate microscale mechanical devices that are electrically controlled and measured, in which the MEMS is a technique for fabricating mechanical and electrical devices through the semiconductor process.

Various accelerometers capable of measuring acceleration are being currently developed, and adopted in vehicle air bag systems, Anti-lock Brake Systems (ABS) and general vibrometers. The accelerometers are mainly fabricated through the semiconductor process, and classified into piezoelectric, piezoresistant and capacitance accelerometers. Piezoelectric accelerometers are commercially retrogressing since it is difficult to prepare piezoelectric thin films of excellent properties without static characteristics. Further, piezoresistant accelerometers show a wide range of characteristic change according to temperature variation, which is hardly compensated. Therefore, the current technical trend is inclined to capacitance accelerometers.

The capacitance accelerometers have very excellent characteristics: A capacitance accelerometer shows a small level of characteristic change according to temperature variation, allows a field effect transistor of a high integrity to constitute a signal processing circuit without additional processes, and can be prepared at low cost.

FIG. 1 schematically illustrates a typical accelerometer. As shown in FIG. 1, a conventional capacitance accelerometer 1 includes a floatable mass 10 as a movable structure, suspension beams 22 and 24 functioning as springs of a mechanical stiffness for elastically supporting both ends of the mass 10, a plurality of movable electrode fingers 12 and 14 extended outward from the mass 10 into a bilaterally symmetrical configuration seen in the drawing, a plurality of fixed electrode fingers 32 and 34 fixed to both electrode-fixing sections 30a and 30b and spaced from the movable electrode fingers 12 and 14 to a predetermined gap and beam-fixing sections 20a and 20b for fixing the suspension beams 22 and 24 to the bottom of an insulation board. The movable electrode fingers 12 and 14 are adapted to maintain a fixed gap from the fixed electrode fingers 32 and 34 unless any acceleration is applied from the outside so as to keep a predetermined value of capacitance.

The reference numeral 19 designates an etching hole for introducing etching solution therethrough.

Upon application of an external force to the accelerometer 1, the mass 10 is displaced in the direction of the force or the y-axial direction (i.e., the vertical direction seen in the drawing), pulling the movable electrode fingers 12 and 14 fixed thereto in the y-axial direction. This as a result increases and decreases the gaps g1 and g2 from the movable electrode fingers 12 and 14 to the fixed electrode fingers 32 and 34, indicating the displacement of the mass 10.

This changes the capacitance between the movable electrode fingers 12 and 14 and the fixed electrode fingers 32 and 34. The change of capacitance is induced as current into the movable electrode fingers 12 and 14 according to a sensing voltage applied to the fixed electrode fingers 32 and 34, and the current is converted into a voltage and then amplified with an amplifier (not shown) connected to the movable electrode fingers 12 and 14 so that the external acceleration can be measured.

In order to measure external acceleration with respect to x-, y- and z-axes with the accelerometer 1, two accelerometers of this type are horizontally placed so that the mass 10 can be displaced in the x- and y-axial directions, and a third accelerometer of this type is vertically installed to measure the z-axial acceleration through the displacement of the mass 100 in the z-axial direction.

This structure has a problem that the total volume increases because the vertical z-axis accelerometer 1 increases the overall height occupying a large space together with the x- and y-axis accelerometers.

If the height of the z-axis accelerometer 1 is reduced to decrease the overall structure, the change of capacitance between the movable and fixed electrode fingers 12, 14, 32 and 34 becomes excessively small. Then, in order to detect and convert the trace amount of capacitance change into output voltage, it is necessary to provide an amplifier of high amplification rate, a demodulator and a high performance filter around the accelerometer 1. However, this also complicates the overall structure of the accelerometer and raises fabrication cost as well.

Furthermore, because noise components in an input signal are also amplified together, a higher amplification rate generates an output signal containing more noise and non-linear components thereby further deteriorating the performance of the accelerometer.

SUMMARY OF THE INVENTION

Therefore the present invention has been made to solve the foregoing problems of the prior art.

It is an object of the present invention to provide a capacitance z-axis accelerometer which can be integrated together with x- and y-axis accelerometers into a single chip thereby reducing the size of a sensor, maximize the change of capacitance to have excellent acceleration sensitivity in the z-axial direction, reduce the amplification of a signal with an amplifier while decreasing the amplification of noise components contained in the signal to prevent the deterioration of the sensitivity of the sensor, and utilize an amplifier and a filter of low cost.

According to an aspect of the invention for realizing the object, there is provided a capacitance z-axis accelerometer comprising: a fixed electrode having at least two rectangular fixed electrode plates arranged parallel with a top surface of an insulation board, the fixed electrode plates being placed one above another via a plurality of posts and arranged on an electrode-fixing section of the insulation board; a movable electrode having at least two rectangular movable electrode plates alternating with the fixed electrode plates, the movable electrode plates being placed one above another via a plurality of connector posts placed within guide holes perforated through the fixed electrode plates; and a plurality of support beams for connecting the movable electrode with beam-fixing sections, which are arranged respectively adjacent to both ends of the movable electrode, to elastically support the movable electrode.

It is preferred that the fixed electrode plates are placed one above another at a constant gap via a plurality of posts.

It is preferred that the movable electrode plates are placed one above another at a constant gap via a plurality of connector posts for connecting the movable electrode plates together.

It is also preferred that each of the movable electrode plates comprises a rectangular plate having an area smaller than that of each fixed electrode plate.

It is preferred that each of the support beams comprise elastic members of a predetermined length for connecting both ends of the uppermost one and the lowermost one of the movable electrode plates.

It is also preferred that the fixed and movable electrode plates and the support beams are perforated with etching holes for introducing etching solution for the formation of a sacrificial layer for allowing the z-axial displacement of the movable electrodes.

In addition, the capacitance z-axis accelerometer of the invention may further comprise at least one projection extended from the fixed electrode plates or the movable electrode plates to contact adjacent one of the fixed and movable electrode plates in the deformation of the plates.

It is preferred that the projection is conical to perform point-contact with an adjacent and corresponding one of the fixed and movable electrode plates.

It is also preferred that the projection is semicylindrical to perform line-contact with an adjacent and corresponding one of the fixed and movable electrode plates.

According to another aspect of the invention for realizing the object, there is provided a capacitance z-axis accelerometer comprising: first and second fixed electrodes each having at least two rectangular fixed electrode plates arranged parallel with a top surface of an insulation board, the fixed electrode plates being placed one above another via a plurality of posts and arranged on an electrode-fixing section of the insulation board; first and second movable electrodes each having at least two rectangular movable electrode plates alternating with the fixed electrode plates, the movable electrode plates being placed one above another via a plurality of connector posts placed within guide holes perforated through the fixed electrode plates; and a plurality of support beams for connecting the movable electrodes with beam-fixing sections, which arranged respectively adjacent to outer ends of the movable electrodes and between the movable electrodes, to elastically support the movable electrodes.

It is preferred that the support beams elastically connected with the first and second movable electrode have heights different from each other so that changes of capacitance with respect to the z-axial displacement have opposite polarities.

It is also preferred that each of the movable electrode plates comprises a rectangular plate having an area smaller than that of each fixed electrode plate.

It is preferred that each of the support beams comprises elastic members of a predetermined length for connecting both ends of the uppermost one and the lowermost one of the movable electrode plates.

It is also preferred that the fixed and movable electrode plates and the support beams are perforated with etching holes for introducing etching solution for the formation of a sacrificial layer for allowing the z-axial displacement of the movable electrodes.

In addition, the capacitance z-axis accelerometer of the invention may further comprise at least one projection extended from the fixed electrode plates or the movable electrode plates to contact adjacent one of the fixed and movable electrode plates in the deformation of the plates.

It is preferred that the projection is conical to perform point-contact with an adjacent and corresponding one of the fixed and movable electrode plates.

It is also preferred that the projection is semicylindrical to perform line-contact with an adjacent and corresponding one of the fixed and movable electrode plates.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 1:
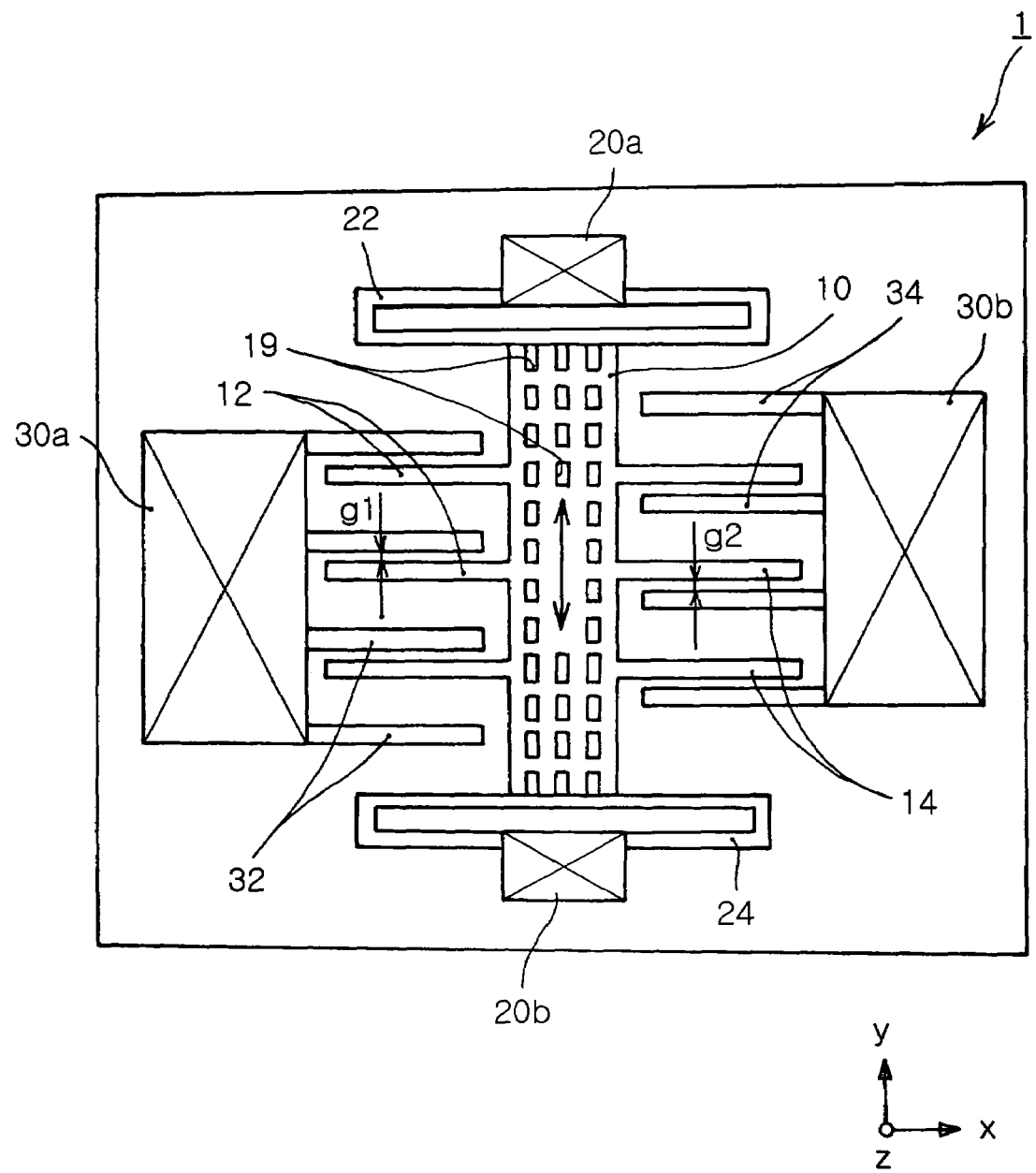
FIG. 1 schematically illustrates a typical accelerometer.
Figure 2:
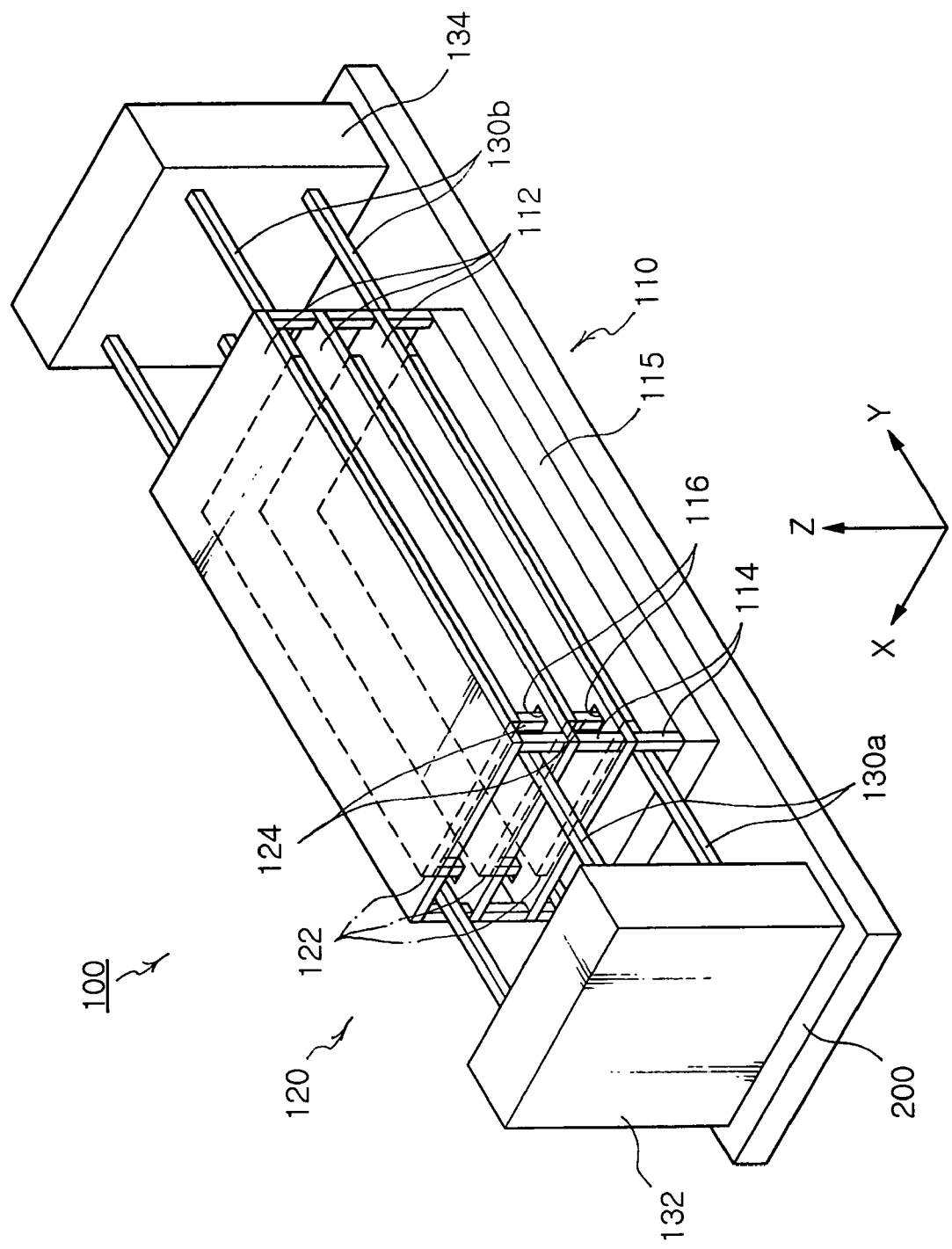
FIG. 2 is a perspective view of a capacitance z-axis accelerometer according to the invention.
Figure 3A:
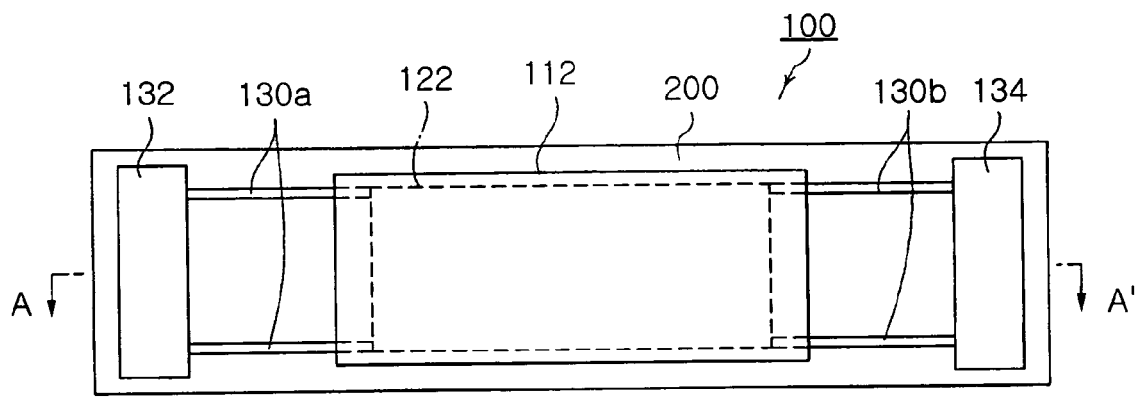
FIG. 3A is a plan view of the capacitance z-axis accelerometer in FIG. 2.
Figure 3B:
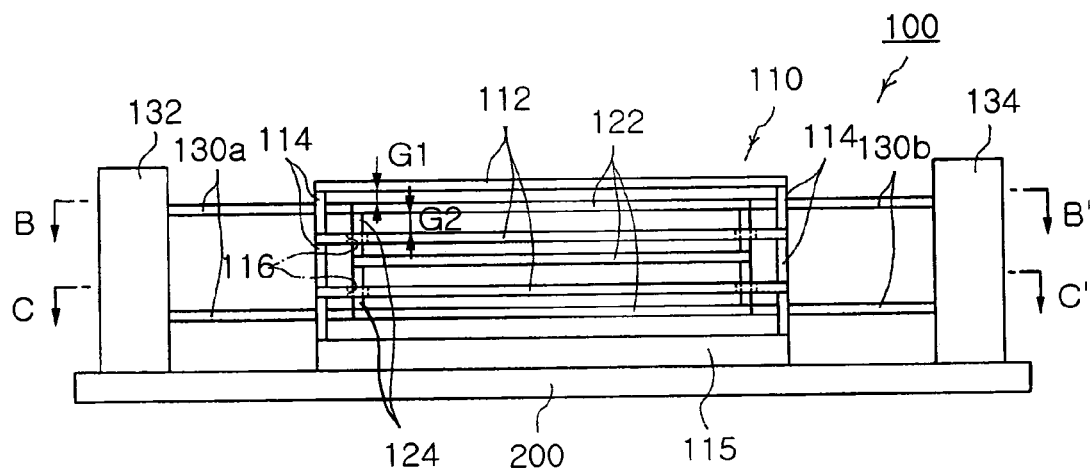
FIG. 3B is a side elevation view of the capacitance z-axis accelerometer in FIG. 2.
Figure 3C:
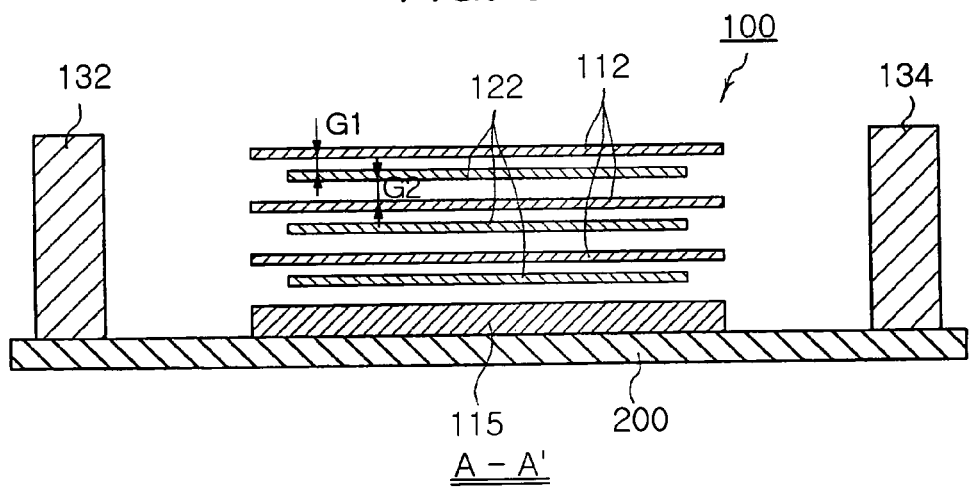
FIG. 3C is a longitudinal sectional view of the capacitance z-axis accelerometer in FIG. 2 taken along a line A–A'.
Figure 4A:
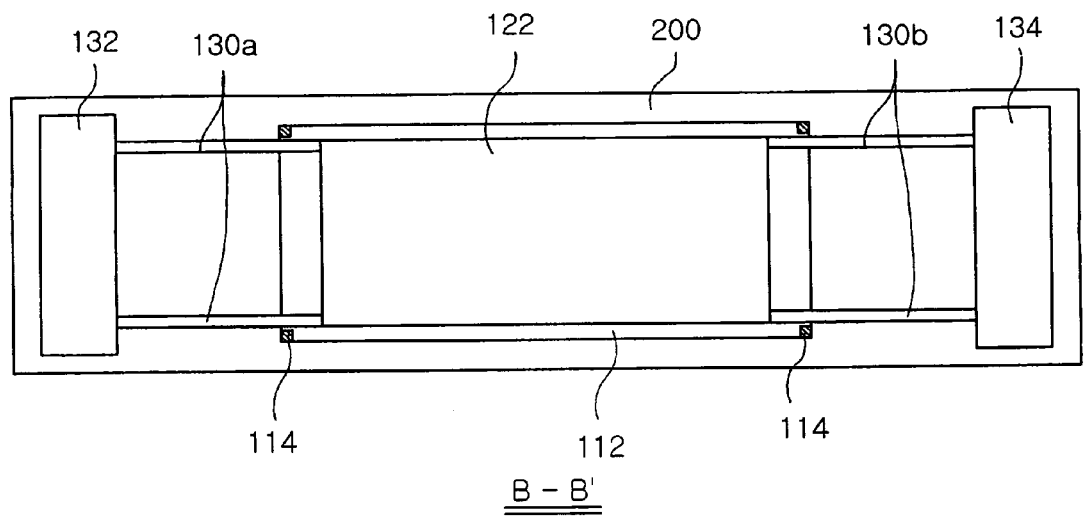
FIG. 4A is a plan view taken along a line B–B' in FIG. 3B.
Figure 4B:
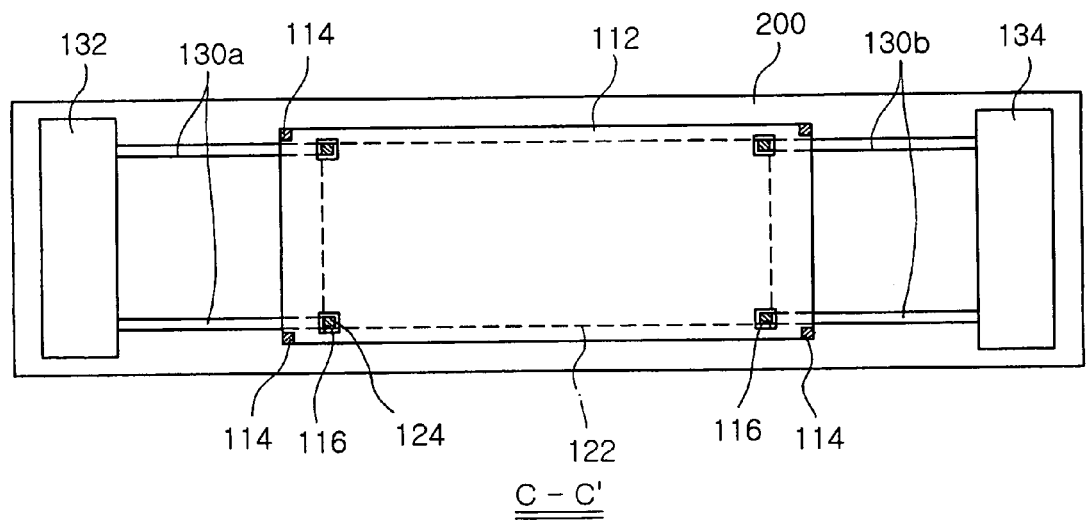
FIG. 4B is a plan view taken along a line C–C' in FIG. 3B.

FIG. 2 is a perspective view of a capacitance z-axis accelerometer according to the invention, FIG. 3A is a plan view of the capacitance z-axis accelerometer in FIG. 2, FIG. 3B is a side elevation view of the capacitance z-axis accelerometer in FIG. 2, FIG. 3C is a longitudinal sectional view of the capacitance z-axis accelerometer in FIG. 2 taken along a line A–A', FIG. 4A is a plan view taken along a line B–B' in FIG. 3B, and FIG. 4B is a plan view taken along a line C–C' in FIG. 3B.

As shown in FIGS. 2 to 4B, an accelerometer 100 of the invention has a plurality of electrode plates placed one above another to achieve a high sensitivity with respect to z-axial acceleration as well as a small installation height so that the accelerator 100 can be integrated together with x- and y-axis accelerometers into one chip. The accelerometer 100 includes a fixed electrode 110, a movable electrode 120 and support beams 130.

The fixed electrode 110 is of a stationary structure arranged on an electrode-fixing section 115 that is placed on an insulation board 200, and includes at least two fixed electrode plates 112 placed one above another at a predetermined gap.

The fixed electrode plates 112 are rectangular electrode members, and arranged in parallel with the top surface of the insulation board 200. The fixed electrode plates 112 are placed one above another via posts 114 that are vertically provided at corners of the fixed electrode plates 112.

Guide holes 116 are formed adjacent to the corners of the fixed electrode plates 112 except for the uppermost one in order to allow the passage of connector posts 124 for connecting movable electrode plates 122 which will be described later.

The movable electrode 120 is of a movable structure arranged in the z-axial direction in a fashion movable with relation to the fixed electrodes 110 to move in the z-axial direction or the external acceleration direction upon application of the external acceleration, and has at least two movable electrode plates 122 which are interposed alternating with the fixed electrode plates 112 to change the gap from the fixed electrode plates 112 so as to change the capacitance.

The movable electrode plates 122 are of rectangular plate-shaped electrode members, and placed over or under the fixed electrode plates 112 at a predetermined gap, in positions parallel with top and bottom surfaces of the fixed electrode plates 112. The movable electrode plates 122 are placed one above another via the connector posts 124 that are provided vertically at corners thereof.

The fixed and movable electrode plates 112 and 122 are placed alternating with each other, and formed through multilayer polysilicon deposition from Sandia Lab. in the United States and electroplating from Microfabrica in the United States.

The fixed electrode plates 112 are placed one above another at a fixed gap via the posts 114 which connect the fixed electrode plates 112 together, and the movable electrode plates 122 are also placed one above another at a fixed gap via the connector posts 124 which connect the movable electrode plates 122 together.

When the movable electrode 120 is displaced in the z-axial direction upward in the drawing, the gap G1 between the movable electrode plates 122 and the fixed electrode plates 112 above the movable electrode plates 122 is narrowed to increase the capacitance, but the gap G2 between the movable electrode plates 122 and the fixed electrode plates 112 under the movable electrode plates 122 is relatively widened to decrease the capacitance. The change of capacitance from the initial value in the upward direction of the movable electrode plates 122 is opposite to that in the downward direction of the movable electrode plates 122.

The guide holes 116 are perforated in the corners of the fixed electrode plates 112 corresponding to the sectional shape and the position of the connector posts 124 so that the connector posts 124 of the movable electrode plates 122 can be freely moved in the z-axial direction.

The movable electrode plates 122 alternating with the fixed electrode plates 112 are shaped as rectangular plates of a surface area smaller than that of the corresponding fixed electrode plates 112.

In this circumstance, although the movable electrode 120 is displaced in a horizontal direction, e.g., the x- or y-axial direction with respect to the fixed electrode 110, the maximum moving range of the movable electrode 120 is within the upper surface area of the fixed electrode plates 112 so that the change of capacitance originated from the gap change does not occur between the fixed and movable electrode plates so as to relatively raise z-axial sensitivity while minimizing x- and y-axial sensitivities.

The support beams 130a and 130b are extended from beam-fixing sections 132 and 134, which are arranged adjacent to both ends of the fixed and movable electrodes 110 and 120, toward the movable electrode plates 122, and made of elastic members such as a leaf spring of a predetermined mechanical elastic modulus for elastically connecting both ends of the movable electrode plates 122 with the beam-fixing sections 132 in order to elastically support the movable electrode 120.

The support beams 130a and 130b are preferably made of elastic beams with leading ends thereof being connected to both ends of the uppermost and lowermost ones of the movable electrode plates 122.

Figure 5:
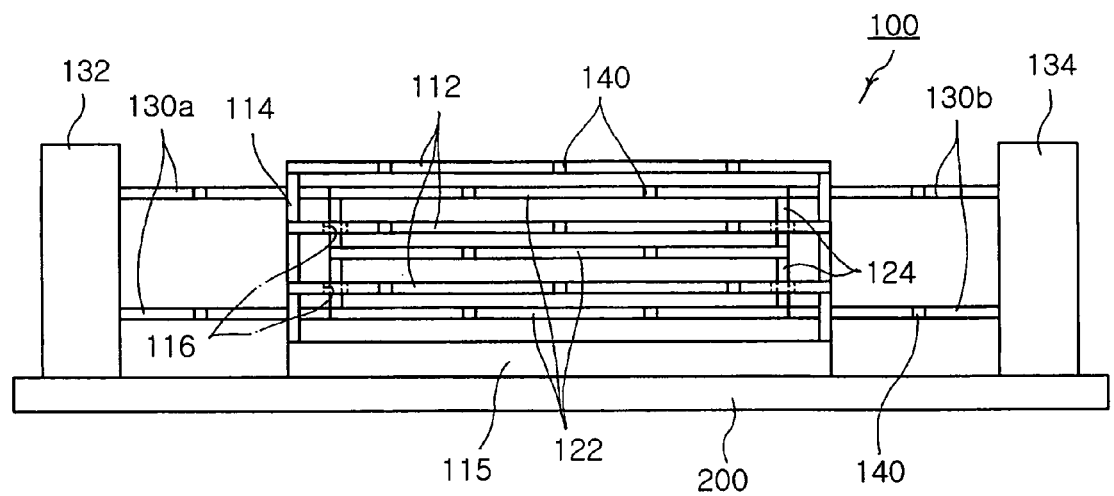
FIG. 5 is a side elevation view of the capacitance z-axis accelerometer having etching holes according to the invention.

Also, as shown in FIG. 5, the fixed and movable electrode plates 112 and 122 and the support beams 130a and 130b are perforated with etching holes 140 for introducing etching solution for the formation of sacrificial layers so that the movable electrode 120 can be displaced freely with respect to the fixed electrode 110 in the z-axial direction.

Figure 6:
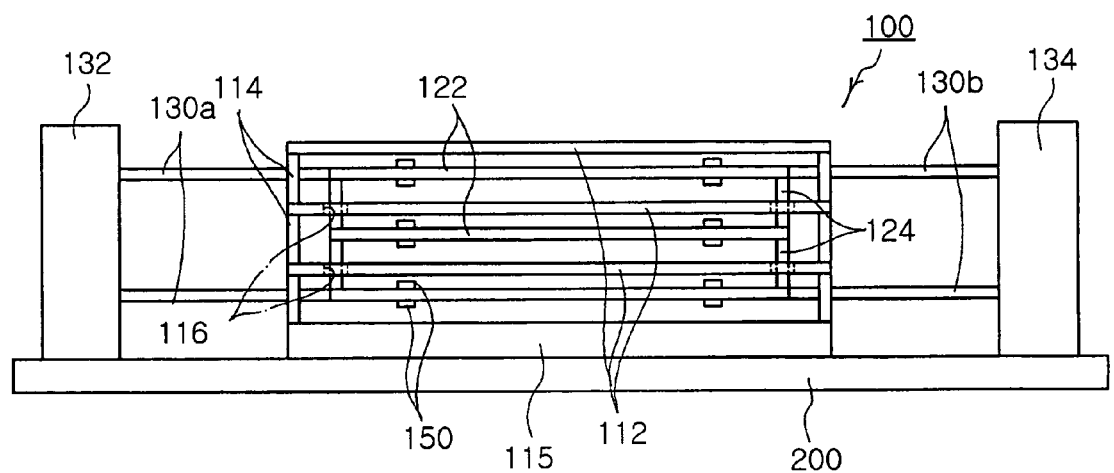
FIG. 6 is a side elevation view of the capacitance z-axis accelerometer having projections according to the invention.

As shown in FIG. 6, at least one projections 150 are extended from the movable electrode plates 122 to contact adjacent and corresponding ones of the fixed electrode plates 112 in the deformation of the movable electrode plates 122. Alternatively, projections 150 may be extended from the fixed electrode plates 112 to contact with corresponding ones of the movable electrode plates 122.

Figure 7A:
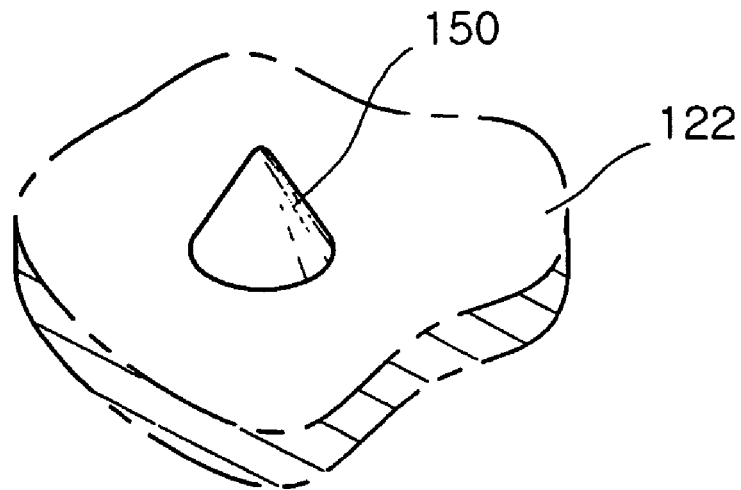
FIGS. 7A and 7B are perspective views of the projections provided in the capacitance z-axis accelerometer according to the invention.
Figure 7B:
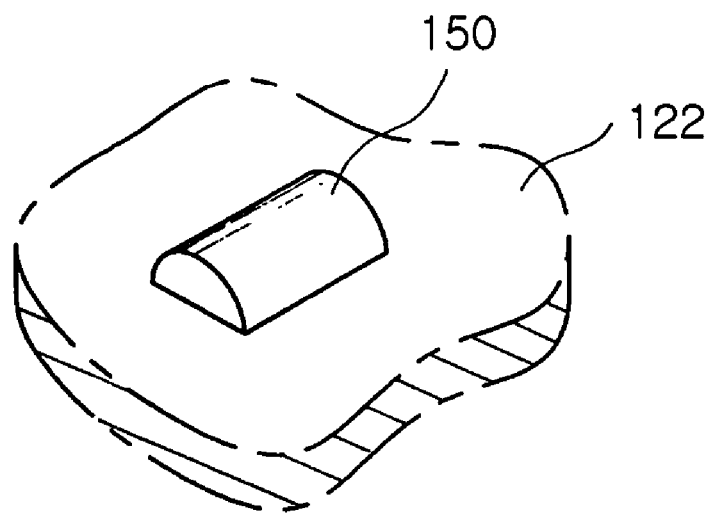

As shown in FIG. 7A, each of the projections 150 is conical to perform point-contact with a corresponding one of the fixed or movable electrode plates 112 and 122. Alternatively, as shown in FIG. 7B, each of the projections 150 may be semicylindrical to perform line-contact with a corresponding one of the fixed or movable electrode plates 112 and 122.

Where the projections 150 are extended from the fixed electrode plates 112 or the movable electrode plates 122, if the movable electrode plates 122 are deformed to narrow the gap from the corresponding fixed electrode plates 112, the projections 150 perform point-contact or line-contact with a corresponding one of the fixed or movable electrode plates 112 or 122 before the movable electrode plates 122 perform face-contact with the corresponding fixed electrode plates 112 in order to prevent any attachment between the fixed and movable electrode plates 112 and 122 which may obstruct the z-axial displacement of the movable electrode 120.

Figure 8:
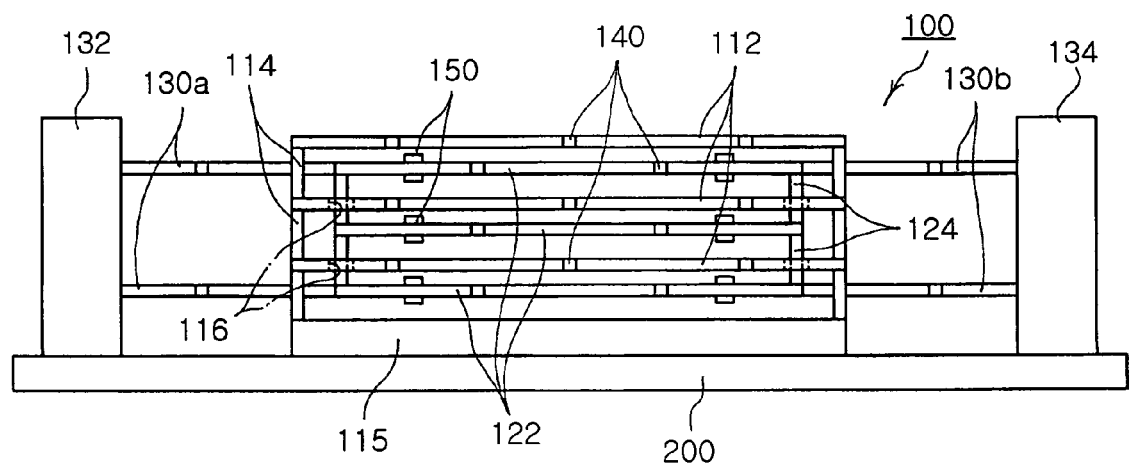
FIG. 8 is a side elevation view of the capacitance z-axis accelerometer having projections and etching holes according to the invention.

As shown in FIG. 8, it is also preferred that the fixed and movable electrode plates 112 and 122 and the support beams 130a and 130b are provided with a plurality of etching holes 140 while the fixed electrode plates 112 or the movable electrode plates 122 are provided with a plurality of projections 150.

Figure 9:
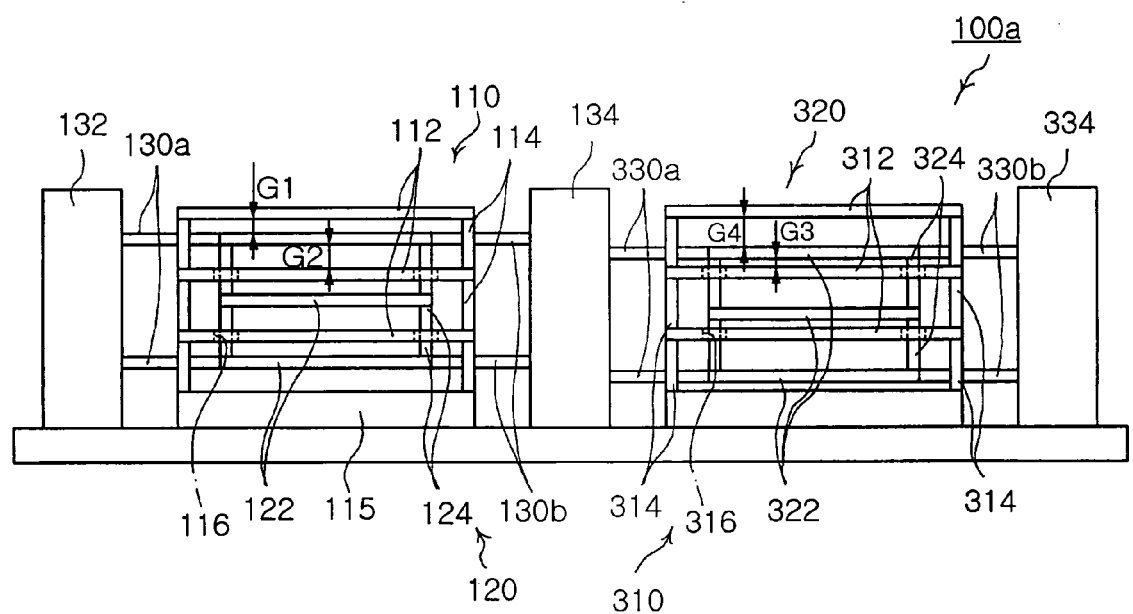
FIG. 9 is a side elevation view illustrating a z-axis accelerometer according to an alternative embodiment of the invention.

FIG. 9 illustrates a z-axis accelerometer according to an alternative embodiment of the invention. As shown in FIG. 9, an accelerometer 100a includes first and second fixed electrodes 110 and 310, first and second movable electrodes 120 and 320 and support beams 130a, 130b, 330a and 330b, which are provided in common as a pair. The first and second fixed electrodes 110 and 310 are of a pair of stationary structures arranged in the left and right and respectively on electrode-fixing sections 115 and 315 of an insulation board 200. The first fixed electrode 110 has at least two rectangular fixed electrode plates 112 placed one above another at a predetermined gap via posts 114, and the second fixed electrode 310 also has at least two rectangular fixed electrode plates 312 placed one above another at a predetermined gap via posts 314.

The first movable electrode 120 includes at least two rectangular movable electrode plates 122 alternating with corresponding ones of the fixed electrode plates 112, and the second movable electrode 320 includes at least two rectangular movable electrode plates 322 alternating with corresponding ones of the fixed electrode plates 312. The first movable electrode plates 122 are placed one above another via posts 124 which are arranged within guide holes 116 perforated through the first fixed electrode plates 112, and the second movable electrodes 322 are placed one above another via posts 324 which are arranged within guide holes 316 perforated through the second fixed electrode plates 312.

The support beams 130a and 130b are of elastic beam structures having a predetermined length for connecting the movable electrode plates 122 of the first movable electrode 120 with beam-fixing sections 132 and 134 to elastically support the first movable electrode plates 122, and the support beams 330a and 330b are of elastic beam structures having a predetermined length for connecting the second movable electrode plates 322 of the second movable electrode 320 with the beam-fixing section 134 and a beam-fixing section 334 to elastically support the second movable electrode plates 322. The intermediate beam-fixing section 134 is placed between the movable electrodes 120 and 320, and the beam-fixing sections 132 and 334 are placed adjacent to outer ends of the movable electrodes 120 and 320.

The support beams 130a and 130b elastically connected with the first movable electrode 120 preferably has a height different from that of the support beams 330a and 330b elastically connected with the second movable electrode 320 so that the change of capacitance in the z-axial direction of the first movable electrode 120 with respect to the first fixed electrode 110 has an opposite polarity from that of the second movable electrode 320 with respect to the second fixed electrode 310 above the insulation board 200. This as a result allows differential operation to be processed without a differential circuit.

In the accelerometer 100a of the alternative embodiment, if an external force displaces the movable electrodes 120 and 320 in the z-axial direction upward with respect to the fixed electrodes 110 and 310, the change of capacitance between the movable electrode plates 122 of the first movable electrode 120 and the alternating first fixed electrode plates 112 has a positive value because the gap G1 from the top surface of each movable electrode plate 122 to a corresponding first fixed electrode plate 112 is narrowed to enhance the capacitance.

On the contrary, the change of capacitance between the movable electrode plates 322 of the second movable electrode 320 and the alternating second fixed electrode plates 312 has a negative value opposite to the firs electrode 110 because the gap G3 from the top surface of each movable electrode plate 322 to a corresponding second fixed electrode plate 312 is widened to reduce the capacitance.

Accordingly, the changes of capacitance in the first and second movable electrodes 120 and 320 may be amplified twice through differential operation without a differential circuit, as expressed in Equation 1:

$$\Delta C = 2 \times [\{(C1/G1) - (C2/G3)\} \times M \times A]/K \qquad \text{Equation 1,}$$

wherein C1 is the initial capacitance between the first movable and fixed electrodes, C2 is the initial capacitance between the second movable and fixed electrodes, G1 and G3 are gaps between the movable plates and the fixed plates, M is the total weight of the movable electrodes and the support beams, A is the acceleration, and K is the spring constant of the support beams.

According to the present invention as set forth above, the rectangular movable electrode plates are placed alternating with the rectangular fixed electrode plates to maximize the change of capacitance in the z-axial direction so that the accelerometer of the invention can have an installation height similar to those of the x- and y-axis accelerometers and thus be integrated together with the same into one chip thereby allowing a final product to be designed in a miniature size.

Moreover, the present invention can maximize the change of capacitance between the movable electrode plates and the fixed electrode plates to enhance the z-axial acceleration sensitivity, reduce the amplification of signals with an amplifier together with noise components in the signals to prevent the sensitivity degradation of a sensor, and utilize a amplifier and/or a filter of low cost to save fabrication cost.

While the present invention has been shown and described in connection with the preferred embodiments, it will be apparent to those skilled in the art that modifications and variations can be made without departing from the spirit and scope of the invention as defined by the appended claims.

What is claimed is:

1. A capacitance z-axis accelerometer comprising:
a fixed electrode having at least two rectangular fixed electrode plates arranged parallel with a top surface of an insulation board, the fixed electrode plates being placed one above another via a plurality of posts and arranged on an electrode-fixing section of the insulation board;
a movable electrode having at least two rectangular movable electrode plates alternating with the fixed electrode plates, the movable electrode plates being placed one above another via a plurality of connector posts placed within guide holes perforated through the fixed electrode plates; and
a plurality of support beams for connecting the movable electrode with beam-fixing sections, which are arranged respectively adjacent to both ends of the movable electrode, to elastically support the movable electrode.

2. The capacitance z-axis accelerometer according to claim 1, wherein the fixed electrode plates are placed one above another at a constant gap via a plurality of posts.

3. The capacitance z-axis accelerometer according to claim 1, wherein the movable electrode plates are placed one above another at a constant gap via a plurality of connector posts for connecting the movable electrode plates together.

4. The capacitance z-axis accelerometer according to claim 1, wherein each of the movable electrode plates comprises a rectangular plate having an area smaller than that of each fixed electrode plate.

5. The capacitance z-axis accelerometer according to claim 1, wherein each of the support beams comprises elastic members of a predetermined length for connecting both ends of the uppermost one and the lowermost one of the movable electrode plates.

6. The capacitance z-axis accelerometer according to claim 1, wherein the fixed and movable electrode plates and the support plates are perforated with etching holes for introducing etching solution for the formation of a sacrificial layer for allowing the z-axial displacement of the movable electrodes.

7. The capacitance z-axis accelerometer according to claim 1, further comprising at least one projection extended from the fixed electrode plates or the movable electrode plates to contact adjacent one of the fixed and movable electrode plates in the deformation of the movable plates.

8. The capacitance z-axis accelerometer according to claim 7, wherein the projection is conical to perform point-contact with an adjacent and corresponding one of the fixed and movable electrode plates.

9. The capacitance z-axis accelerometer according to claim 7, wherein the projection is semicylindrical to perform line-contact with an adjacent and corresponding one of the fixed and movable electrode plates.

10. A capacitance z-axis accelerometer comprising:
first and second fixed electrodes each having at least two rectangular fixed electrode plates arranged parallel with a top surface of an insulation board, the fixed electrode plates being placed one above another via a plurality of posts and arranged on an electrode-fixing section of the insulation board;
first and second movable electrodes each having at least two rectangular movable electrode plates alternating with the fixed electrode plates, the movable electrode plates being placed one above another via a plurality of connector posts placed within guide holes perforated through the fixed electrode plates; and
a plurality of support beams for connecting the movable electrodes with beam-fixing sections, which are arranged respectively adjacent to outer ends of the movable electrodes and between the movable electrodes, to elastically support the movable electrodes.

11. The capacitance z-axis accelerometer according to claim 10, wherein the support beams elastically connected with the first and second movable electrode have heights different from each other so that changes of capacitance with respect to the z-axial displacement have opposite polarities.

12. The capacitance z-axis accelerometer according to claim 10, wherein each of the movable electrode plates comprises a rectangular plate having an area smaller than that of each fixed electrode plate.

13. The capacitance z-axis accelerometer according to claim 10, wherein each of the support beams comprises elastic members of a predetermined length for connecting both ends of the uppermost one and the lowermost one of the movable electrode plates.

14. The capacitance z-axis accelerometer according to claim 10, wherein the fixed and movable electrode plates and the support beams are perforated with etching holes for introducing etching solution for the formation of a sacrificial layer for allowing the z-axial displacement of the movable electrodes.

15. The capacitance z-axis accelerometer according to claim 10, further comprising at least one projection extended from the fixed electrode plates or the movable electrode plates to contact adjacent one of the fixed and movable electrode plates in the deformation of the plates.

16. The capacitance z-axis accelerometer according to claim 15, wherein the projection is conical to perform point-contact with an adjacent and corresponding one of the fixed and movable electrode plates.

17. The capacitance z-axis accelerometer according to claim 15, wherein the projection is semicylindrical to perform line-contact with an adjacent and corresponding one of the fixed and movable electrode plates.

* * * * *